United States Patent [19]

Kollmann

[11] 4,425,066
[45] Jan. 10, 1984

[54] DRILL SCREW

[76] Inventor: Harald Kollmann, Suedstrasse 21, 5860 Iserlohn, Fed. Rep. of Germany

[21] Appl. No.: 272,590

[22] Filed: Jun. 11, 1981

[30] Foreign Application Priority Data

Jun. 13, 1980 [DE] Fed. Rep. of Germany ....... 3022187

[51] Int. Cl.³ .............................................. F16B 35/00
[52] U.S. Cl. .................................... 411/387; 411/420
[58] Field of Search .............. 411/387, 420, 421, 418, 411/417, 423, 378; 408/230, 229, 226

[56] References Cited

U.S. PATENT DOCUMENTS 2,263,424 11/1941 Langer ................................. 411/387
3,738,218 6/1973 Gutshall ............................. 411/387

FOREIGN PATENT DOCUMENTS 976849 12/1964 United Kingdom ................ 411/420
2063731 11/1979 United Kingdom ................ 411/387

Primary Examiner—Wayne L. Shedd
Attorney, Agent, or Firm—Thomas W. Buckman; Donald D. Mondul; David I. Roche

[57] ABSTRACT

A drill screw having a drilling section with a thread form thereon in which truncated thread crests taper inwardly and thread roots taper outwardly as they progress in the direction of the tip. The drilling section further includes a flute having a chip deflecting surface to facilitate metal removal during installation. The screw preferably has machine threads which extend to portions of the drilling section which are adjacent to the flutes. Because of the position and configuration of the threads, the screw of the present invention is particularly adapted for use with hard supports.

5 Claims, 2 Drawing Figures

DRILL SCREW

BACKGROUND AND SUMMARY OF THE INVENTION

The invention relates to a drill screw for fastening a structural member to a, in particular, harder supporting member, comprising a head and a shank joining the head and having a self-cutting machine thread which is flattened to have a decreasing depth of thread and decreasing outer diameter in a drilling section joined by a tapered drill bit, with the axial length of the drill section being approximately equal to the thickness of the structural member to be fastened and the axial position and length of a thread principal portion disposed closer to the head and formed with full depth of thread and full outer diameter being dimensioned such that with the drill screw in the fully threaded-in condition the supporting member is threadedly connected to the thread principal portion, with two diametrically opposed chip grooves having an approximately rectangular cross sectional area being furthermore provided in the drill section and the drill bit, and a transverse cutting edge extending between the chip grooves provided at the free end of the drill bit, the chip groove areas disposed to the rear when looking in the direction of screwing-in of the screw furthermore forming cutting edges with the portions of the drill section that were left untouched between the chip grooves and the drill bit, and with the conical basic shape of the drill bit being furthermore preferably modified by flats extending from the transverse cutting edge.

Such a drill screw has become known from the German publication letter No. 13 03 320. Also the German publication letter No. 14 00 853 shows a similar drill screw, however, not with a machined thread (V-thread) but with a sheet metal screw thread.

When using the known drill screws of the type as indicated above cases have arisen in which during the initial phase of performing the drilling or turning action in the harder supporting member the drill bit was damaged and thereby the further drilling or screwing-in was rendered difficult. The near-at-hand remedy of meeting these disadvantageous possibilities by using a material of higher strength for the drill screw necessitates an unreasonably high amount of expenses which is not tolerable with the usual applications of drill screws; drill screws are typical mass production articles which are normally used only once or at best a few times.

It is the object of the invention to provide a drill screw for fastening a structural member on a preferably harder supporting member with which the danger of damaging the drill bit is strongly reduced at low cost.

According to the invention this object is attained with the aid of a drill screw of the type mentioned at the beginning which is characterized in that the bottom in each chip groove is occupied by a flute the outer surface of which forms a transverse area extending between the groove side walls and forming in common with them two inner edges, and in that the transverse cutting edge extends between the inner edges disposed to the rear looking in the direction of screwing-in of the screw.

It has been found that with the drill screw according to the invention the danger of the drill bit getting damaged is very strongly reduced and practically eliminated. According to the present state of knowledge this is to be attributed above all to the fact that due to the flute occupying the chip groove bottom the strength is relatively strongly increased just in the particularly endangered region, especially in the drill bit. The screw is therefore in a position with a higher degree of safety to withstand the functionally conditioned load peaks, especially when stripping the thread pre-cut in the structural member to be fastened; this effect is still enhanced by the fact that the machined thread used with the screw according to the invention has a finer thread lead than the sheet metal screw threads otherwise largely used in connection with drill screws, so that the compulsory feed first occurring when drilling into the supporting member is correspondingly reduced through the thread pre-cut in the fastening member. Accordingly, the advantages of the drill screw according to the invention are particularly significant vis-a-vis drill screws having a wood or sheet metal screw thread (for instance, German publication letter No. 14 00 853). The screw according to the invention unexpectedly still shows the additional advantage that harder and thicker supporting members may be used without specific cutting edges having to be provided at the drill screw within the thread; this advantage, too, according to the present state of knowledge is to be attributed to the altogether strongly increased loading capacity of the drilling portion and the drill bit.

The production of the screw according to the invention is not more difficult than that of known drill screws of the same species; especially, the chip grooves provided with a flute can be produced by cold-forming processes in the same manner as the usual chip grooves having a fully relieved bottom. The advantages of the drill screw according to the invention are obtained solely through constructional measures and not through selection of a material of higher strength and thus a correspondingly more expensive material.

In a further development of the invention a still higher increase of the loading capacity may be obtained in the particularly endangered region of the drill section and the drill bit by enlarging the thread core diameter in the drilling section towards the drill bit. This not only reduces still further the depth of thread towards the drill bit so that the drilling and the initial phase of thread cutting are facilitated as is the stripping of a pre-cut thread but also the reduction of the material cross sectional area which due to the course of the chip grooves increases towards the drill bit is at least in part compensated for; this clearly contributes to the increase in strength.

The invention is described in more detail in the following specification by way of an example as shown in the accompanying drawings.

BRIEF DESCRIPTION OF THE DRAWINGS

Figure 1:
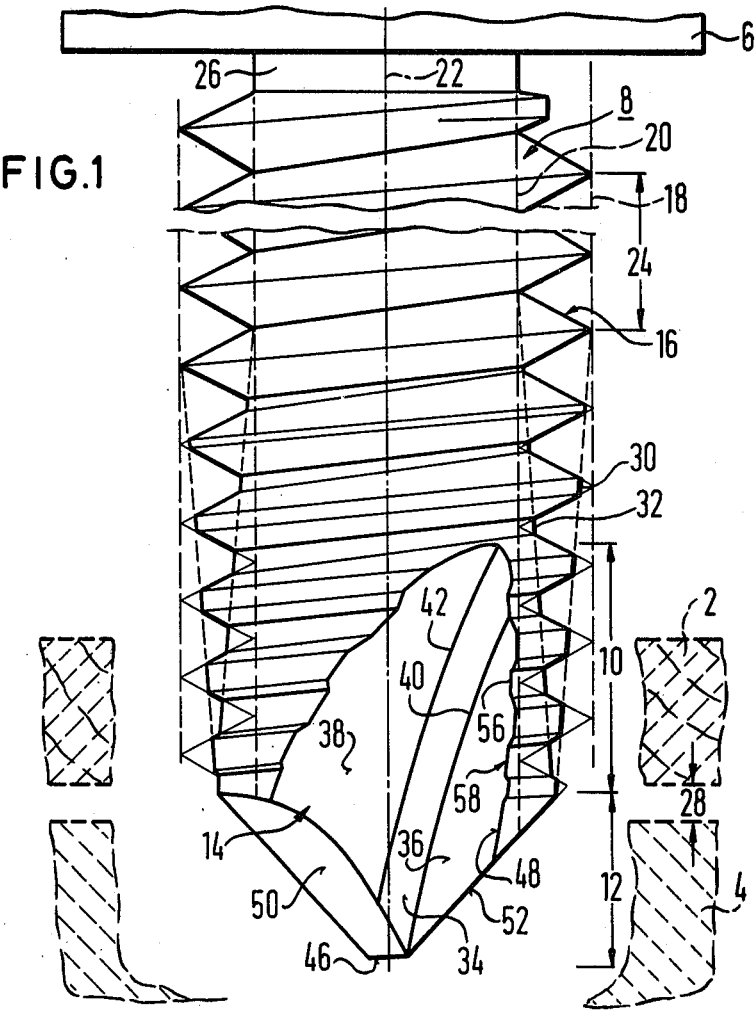
FIG. 1 is a diagrammatic partial side view of a drill screw according to the invention; the figure also shows a structural member and a supporting member.

FIG. 1 shows a drill screw in one phase during the use thereof for fastening a structural member 2 on a harder supporting member 4. The structural member 2 may consist, for instance, of synthetic material, wood or similar materials, the supporting member 4 of aluminum, steel or the like. The drill screw comprises a head 6, in which is provided a cross slot or a transverse slot, for example, for engagement by a tool, and a shank 8 adjoining thereat. The shank terminates in a drilling section 10 and a drill bit 12 joining it; in this axial region there are provided two diametrically opposed chip grooves 14. The shank 18 is provided with a self-cutting machine thread (V-thread) 16, which preferably is dimensioned according to DIN standards. The outer diameter of the thread is indicated by the dashed line 18, the core diameter being indicated by the dashed line 20. The screw center axis 22 is shown in dash-dotted lines. In the drilling section 10, the thread core diameter increases towards the drill bit 12. With the embodiment shown the thread 16 extends as far as to the drill bit 12. Compared with screws having a drill bit following a threadless shank end portion (for instance, according to German publication letter No. 1 303 320), this makes possible a shorter overall length and enables use also for fastening applications in which the thread is to come into gripping engagement over a short way and a threadless portion would be obstructing. As will be seen from FIG. 1 which, by the way, is not true to scale, enlargements of the thread core diameter by about 10 to 30% are easily possible, compared to the core diameter in a thread main section 24 disposed closer to the head 6. In the embodiment shown the increase of the thread core diameter begins already before the beginning of the actual drilling section 10. Towards the head 6 there may still be provided a threadless portion 26 between the thread main portion 24 and the head; in the embodiment shown, however, the latter is very short.

As also is the case with other drill screws, the axial length of the drilling section 10 is at least about equal to the thickness of the structural member 2 with some extra measure ordinarily still having to be added to this thickness for an interspace 28 expected to form between the structural member 2 and the supporting member 4 in operation. Same as is the case with the usual drill screws, the axial length and the axial position of the thread main portion 24 are selected to be such that with the drill screw in its condition of being fully threaded-in, the thread main portion 24 is threadedly connected in the supporting member 4.

In the embodiment shown the outer diameter of the thread 16 is reduced in a direction towards the drill bit 12. The reduction in strength conditioned thereby is relatively low; essentially more strongly marked is the increase in strength due to the enlargement of the core diameter because thereby the notches formed between the courses of thread which have a particularly strong strength-reducing effect are more and more filled in in a direction towards the drill bit. In the case of the embodiment shown the increase in the core diameter is about equal to the decrease in the outside diameter. It will be noted that the profiles of all the courses of thread are components of one unitary thread basic profile as formed in the main portion 24. This facilitates the production of the screw. Because of the unitary basic profile the courses of thread are provided with flats 30 becoming increasingly broader towards the drill bit 10, and between the courses of thread there forms a core groove 32 which becomes increasingly broader and shallower. The depth of the surface relief structure thus is constantly decreasing towards the drill bit with increasing medium diameter; this, too, leads to a marked increase in strength.

The two chip grooves 14 are equal; therefore, only the one chip groove 14 will be described in more detail which is visible in FIG. 1. The chip groove 14 extends from the conical basic shape of the drill bit 12 to end in the drilling portion 10 at an acute angle and at its bottom is occupied in part by a web-like flat flute 34 the outer surface of which forms a transverse surface extending between the groove side walls 36, 38 and forming two groove inner edges 40 and 42, respectively. Extending between the inner edges of the two chip grooves 14 disposed to the rear looking in the direction 44 of threading-in of the screws is the transverse cutting edge 46. The chip groove surfaces 36 disposed to the rear in the direction 44 of threading-in of the screws are forming cutting edges 48 together with the parts of the drilling portion having remained between the chip grooves 14, and the drill bit 12. The conical basic shape of the drill bit 12 is modified to assume the shape of a roof by flats 50 extending from the transverse cutting edge 46. These flats 50 form undercut areas for the portions 52 of the cutting edge 48 disposed in the drill bit 12 and increase the cutting performance of the initial phase of the drilling operation. Also the surface of the flute 34 and the chip groove surfaces 36 disposed to the rear looking in the direction 44 of threading-in of the screw form undercut areas for the cutting edges 48 formed by them. This, too, serves to increase the cutting output, especially in the further progress of the drilling operation.

In the embodiment shown, the edges 54 formed between the flutes 34 and the outer surface of the drill bit 12 respectively form an acute angle with the transverse cutting edge 46. It has been found that this is especially favourable for the cutting output in the initial phase of the drilling operation.

Figure 2:
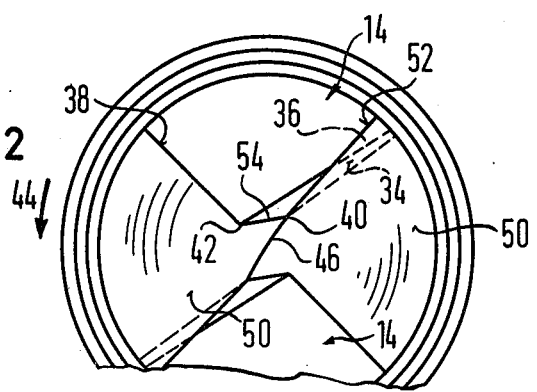
FIG. 2 is a diagrammatic top plan view taken on the drill bit of the screw shown in FIG. 1.

As will be seen from FIG. 2, with the embodiment shown, the chip groove surfaces 38 disposed in front looking in the direction 44 of threading-in of the screws are disposed essentially on a diameter of the drill screw. This simplifies the production of the screw. In contrast thereto, the portions 52 of the cutting edges 48 disposed in the drill bit 12 are extending in an offset arrangement with respect to each other in relation to a diameter of the screw extending between them, in order to form a web between themselves in which the transverse cutting edge 46 extends.

With the embodiment shown, the thread 16 is produced by cold forming after the chip grooves 14 have been made, especially by rolling. In this operation, due to the courses of thread present in the drilling section 10, toothlike deformations 56 are generated in the section 48 extending through the thread 16. These deformations 56 act as laniary teeth in the cutting operation assisting in performing said operation.

I claim:

1. A drill screw for fastening a structural member to a hard supporting member comprising:
   (a) a shank having a head at one end and,
   (b) a drilling section at the other end of said shank, said drilling section including a pair of diametrically opposite flutes, said flutes each defined by three substantially flat surfaces, a pair of heel surfaces intersecting to form a chisel point,
   (c) machine threads on said shank extending substantially to said heel surfaces, said threads having flat crests adjacent the drilling section and sharp crests at middle portions of said shank, and said threads having flat root sections adjacent the drilling section and sharp root sections at middle portions of said shank, said threads having substantially uniform pitch, and said flat root sections tapering radially outwardly in a direction away from said head, and said flat crest portions tapering radially inwardly in a direction away from said head, said threads intersecting a substantial portion of said flutes, whereby said screw can simultaneously drill and tap said hard supporting member.

2. A drill screw in accordance with claim 1 wherein one of said three flat surfaces of each of said flutes forms a positive rake at an intersection with one of said heel surfaces, forming an undercut in said drilling section.

3. A drill screw in accordance with claim 1 wherein one of said three flat surfaces of each of said flutes forms a positive rake at an intersection with the outer portions of said shank.

4. A drill screw in accordance with claim 1 wherein said flutes have a surface which is substantially radial.

5. A drill screw in accordance with claim 1 wherein intersections between said heel surfaces and said flutes are offset relative to each other, and are not diametrically aligned.

* * * * *